United States Patent [19]
Sekiguchi et al.

[11] Patent Number: 4,551,583
[45] Date of Patent: Nov. 5, 1985

[54] CONTROL SIGNAL TRANSMISSION SYSTEM FOR KEY TELEPHONE SYSTEM

[75] Inventors: Koichi Sekiguchi, Asaka; Hikaru Takematsu, Higashikurume; Kazuyuki Yamamoto; Teruyuki Kubo, both of Yokohama, all of Japan

[73] Assignees: Telegraph & Telephone Pub. Corp.; Iwasaki Tsushinki Kabushiki Kaisha, both of Tokyo, Japan

[21] Appl. No.: 587,373

[22] Filed: Mar. 8, 1984

Related U.S. Application Data

[63] Continuation of Ser. No. 346,006, Feb. 5, 1981, , which is a continuation-in-part of Ser. No. 172,012, Jul. 24, 1980, abandoned.

[30] Foreign Application Priority Data

Jul. 30, 1979 [JP] Japan ................................. 54-97066

[51] Int. Cl.⁴ ........................ H04M 1/00; H04Q 5/18
[52] U.S. Cl. .............................. 179/99 M; 179/99 LS
[58] Field of Search .............. 179/99 M, 99 LS, 99 R; 370/100, 103

[56] References Cited
U.S. PATENT DOCUMENTS

| 4,027,110 | 5/1977 | Takematsu et al. | 179/99 M |
| 4,061,887 | 12/1977 | Kasson et al. | 179/99 M |
| 4,125,749 | 11/1978 | Kinoshita et al. | 179/18 J |
| 4,203,011 | 5/1980 | Coviello | 179/99 M |
| 4,314,109 | 2/1982 | Sekiguchi et al. | 179/99 M |
| 4,315,110 | 2/1982 | Davis | 179/99 M |

Primary Examiner—Gerald L. Brigance
Attorney, Agent, or Firm—Robert E. Burns; Emmanuel J. Lobato; Bruce L. Adams

[57] ABSTRACT

A control signal transmission system for a key telephone system, in which control signal information is transmitted in a parallel signal configuration between a plurality of key telephone sets and a key service unit by the use of transmission lines one-to-one corresponding to the individual key telephone sets, and in which the information between the key telephone sets is transmitted using a serial signal format of a frame configuration so that time slots of respective frames are synchronized with respect to all of the transmission lines.

5 Claims, 6 Drawing Figures

CONTROL SIGNAL TRANSMISSION SYSTEM FOR KEY TELEPHONE SYSTEM

CROSS REFERENCE TO RELATED APPLICATION

This application is a continuation of our copending application, Ser. No. 346,006, filed on Feb. 5, 1981 and which is a continuation-in-part application of application Ser. No. 172,012 filed on July 24, 1980 and now abandoned.

FIELD OF THE INVENTION

This invention relates to a system for transmitting various control signals between a key service unit and each key telephone set in a key telephone system.

DESCRIPTION OF THE PRIOR ART

Conventional types of key telephone systems employ cable conductors having one-to-one correspondence to control signals and hence require a number of cable conductors employed as control information transmission lines between a key service unit and key telephone sets. Recently, a demand has sprung up for the reduction of the number of cable conductors, and to meet such a demand, it has been proposed to convert control information between the key service unit and the key telephone sets to a time-division pulse train so as to transmit them over several cables. This is carried into practice by a system in which information indicative of keys, lamps and the like data in the individual key telephone sets is converted into time-division pulses, and these pulses are further time-divided and assigned to time slots successively allocated to the key telephone sets. In this case, however, the data amount of the time-division pulse train must necessarily exceed an amount equal to (the data amount of each key telephone set) x (the number of key telephone sets connectable to the key service unit). Accordingly, the line speed must be increased as the scale of the key telephone system becomes large. Further, it is often advantageous under the recent technical development to use a microcomputer as a control circuit for the key service unit and the key telephone sets; in this case, in view of its throughput, a lower line speed is preferred. This necessitates a buffer register for adjustment between the abovesaid high line speed and an interface circuit, such as a pulse transformer, for efficient transmission of high-speed pulses, resulting in the key telephone system becoming complicated, large-sized and expensive and posing a problem in reliability.

SUMMARY OF THE INVENTION

It is an object of the present invention to provide a control signal transmission system for a key telephone system, which overcomes the abovesaid shortcomings of the prior art and is capable of transmitting control signals between a key service unit and each key telephone set with high reliability using a simple circuit construction.

To achieve the above-mentioned object, the present invention employs a system in which, the abovementioned transmission signals, corresponding to data of the respective key telephone sets are transmitted in a parallel signal configuration. That is, the key and lamp data of the respective key telephone sets, corresponding information is transmitted from the key service unit to the key telephone sets or vice versa at the same time; information inherent to individual key telephone sets is transmitted on a time-division basis; and information between the key telephone sets is transmitted on a spacedivision basis. The use of such a data transmission format enables low-speed DC transmission of the control signals, simplifies the key telephone system and makes it possible for it to be small-sized, inexpensive and highly reliable.

BRIEF DESCRIPTION OF THE DRAWINGS

The principle, construction and operation of this invention will be clearly understood from the following detailed description taken in conjunction with the accompanying drawings, in which.

DETAILED DESCRIPTION

Figure 1:
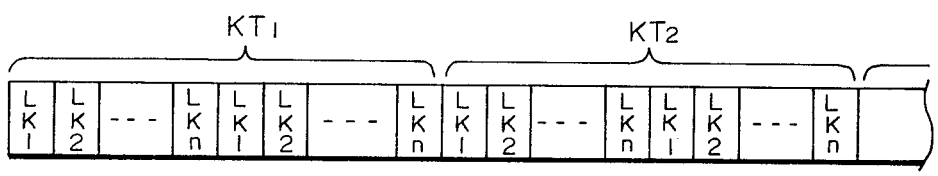
FIG. 1 is a diagram showing the data format of a transmission signal used in the prior art system.

In the prior art, key and lamp data of all the key telephone sets are time-divisionally transmitted in a serial signal configuration as shown in FIG. 1. Reference numerals are the same as those indicated in FIG. 2, so that the data format shown in FIG. 1 will be understood in comparison with FIG. 2.

Figure 2:
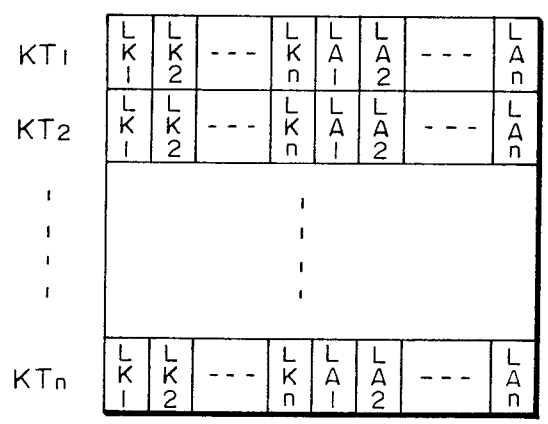
FIG. 2 is a diagram showing the data format of a transmission signal employed in the present invention.

FIG. 2 shows an example of the data format for use in the present invention. In FIG. 2, reference characters $LK_1, LK_2, \ldots LK_n$ indicate information which is produced upon depression of keys of key telephone sets and sent from key telephone sets to a key service unit; and $LA_1, \ldots LA_n$ designate information for lighting lamps of the key telephone sets, which information is sent from the key service unit to the key telephone sets. In FIG. 2, the first line is a data format of a key telephone set $KT_1$, which is time-divided from left to right. The second line is data of a key telephone set $KT_2$, and the n-th line is data of a key telephone set $KT_n$, the data being space-divided downwardly.

Figure 3:
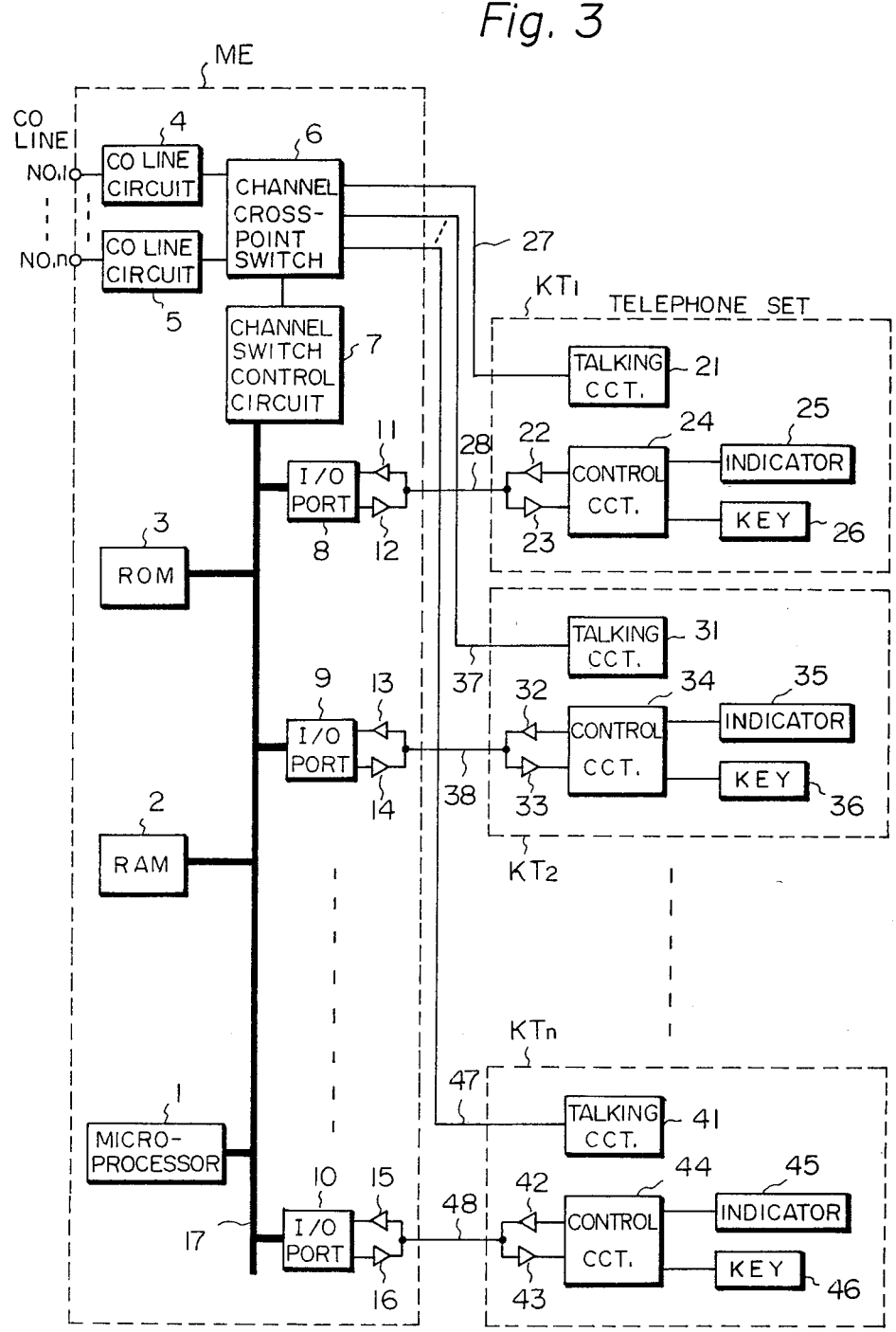
FIG. 3 is a block diagram illustrating an example of the circuit arrangement of the present invention.

FIG. 3 illustrates an example of the circuit arrangement of the present invention. In FIG. 3, reference character ME indicates a key service unit; $KT_1, KT_2, \ldots KT_n$ designate key telephone sets; 1 identifies a microprocessor; 2 denotes a RAM (Random Access Memory); 3 represents a ROM (Read Only Memory); 4 and 5 show CO line circuits; 6 refers to a channel cross-point switch; 7 indicates a channel switch control circuit; 8, 9 and 10 designate I/O ports; 11, 12, 13, 14, 15, 16, 22, 23, 32, 33, 42 and 43 identify inverters; 21, 31 and 41 denote talking circuits of the key telephone sets; 24, 34 and 44 represent key telephone set control circuits, each including a parallel-serial signal converter; 25, 35 and 45 show lamps or like indicators; 26, 36 and 46 refer to keys or like data input means; 27, 37 and 47 indicate communication lines; 28, 38 and 48 designate control lines; and 17 identifies a bus line.

Next, a description will be given of the operation of the above example between the key telephone set $KT_1$ and the key service unit ME. Upon manipulation of a key 26 of the key telephone set $KT_1$, key information is converted into the control signal of the data format of the first line in FIG. 2, by the telephone set control circuit 24 which performs parallel-serial signal conversion, and the output therefrom is applied to the I/O port 8 via the inverter 22, the control line 28 and the inverter 11 and then stored in the RAM 2 under the control of the microprocessor 1. This stored content is controlled by the microprocessor 1 in accordance with a program of the ROM 3 and then applied, as information for turning ON the indicator (for example a CO line lamp), 25 through the I/O port 8, the inverter 12, the control line 28 and the inverter 23, thereafter being applied in the form of the data format of FIG. 2 to the telephone set control circuit 24, wherein the information is processed to activate (turn ON) the indicator 25. At this time, as shown in FIG. 2, in the same time slot as the abovesaid information, signals for activating (turning ON) the indicators of the other key telephone sets KT ($KT_2$... $KT_n$) are each transmitted via the I/O port, the inverter and the control line assigned to each key telephone set KT. As a consequence, the indicators of these key telephone units KT are activated for indicating that the communication circuit (for example, a CO line) being indicated is busy.

On the other hand, the controlled state of the key 26 stored in the RAM 2 is further processed in accordance with the program content of the ROM 3 to activate the channel switch control circuit 7, those output is provided to the channel cross-point switch 6 to operate it to connect the CO line (for example, 1) to the talking circuit 21 of the key telephone set $KT_1$, thus permitting a talking operation between the CO line 1 and the key telephone set $KT_1$. Data pulses (for example, key information for the CO line 1) indicative of the same content for all the key telephone sets KT are set in the same time slot, as shown in FIG. 2. Further, the RAM 2 is assigned to the I/O ports in bit corresponding relation. For instance, if use is made of an 8-bit frame configuration for each of the RAM and the microprocessor 1, then information of eight key telephone sets KT can be simultaneously stored by one access operation in the RAM 2. Consequently, the time necessary for input and output of information for the key telephone sets KT can be reduced by a fraction ($\frac{1}{8}$) of the time which would otherwise be needed. This is very effective means for reducing the processing time and enhancing the throughput of the key telephone system or the like in which the amounts of input and output information handled are large and the processing time of the microprocessor is mostly assigned for the input and output operations of the abovesaid data in a case of using ordinary means.

The above has described the access operation to the RAM 2 under program control, but the same results can also be obtained in a case of storing the abovementioned data directly in the RAM by a system which is so arranged that the data are stored, for example, by a DMA control circuit (Direct Memory Access control circuit) or like means in the RAM and processed by a microprocessor. Moreover, in a case of processing the data by a microcomputer, the control circuit 24, 34, 44 may also be a circuit of low processing speed without using a buffer register for speed adjustment.

As has been described in the foregoing, according to the present invention, in a case of central processing of a key telephone system by a microcomputer, its throughput can be reduced, permitting the use of a microcomputer or the like of low throughput. Furthermore, by decreasing the line speed, the hardware scale of an interface circuit for a transmission circuit can be reduced, and the key telephone system can be made small-sized and lightweight; and enhancement of its reliability can also be expected.

Figure 4:
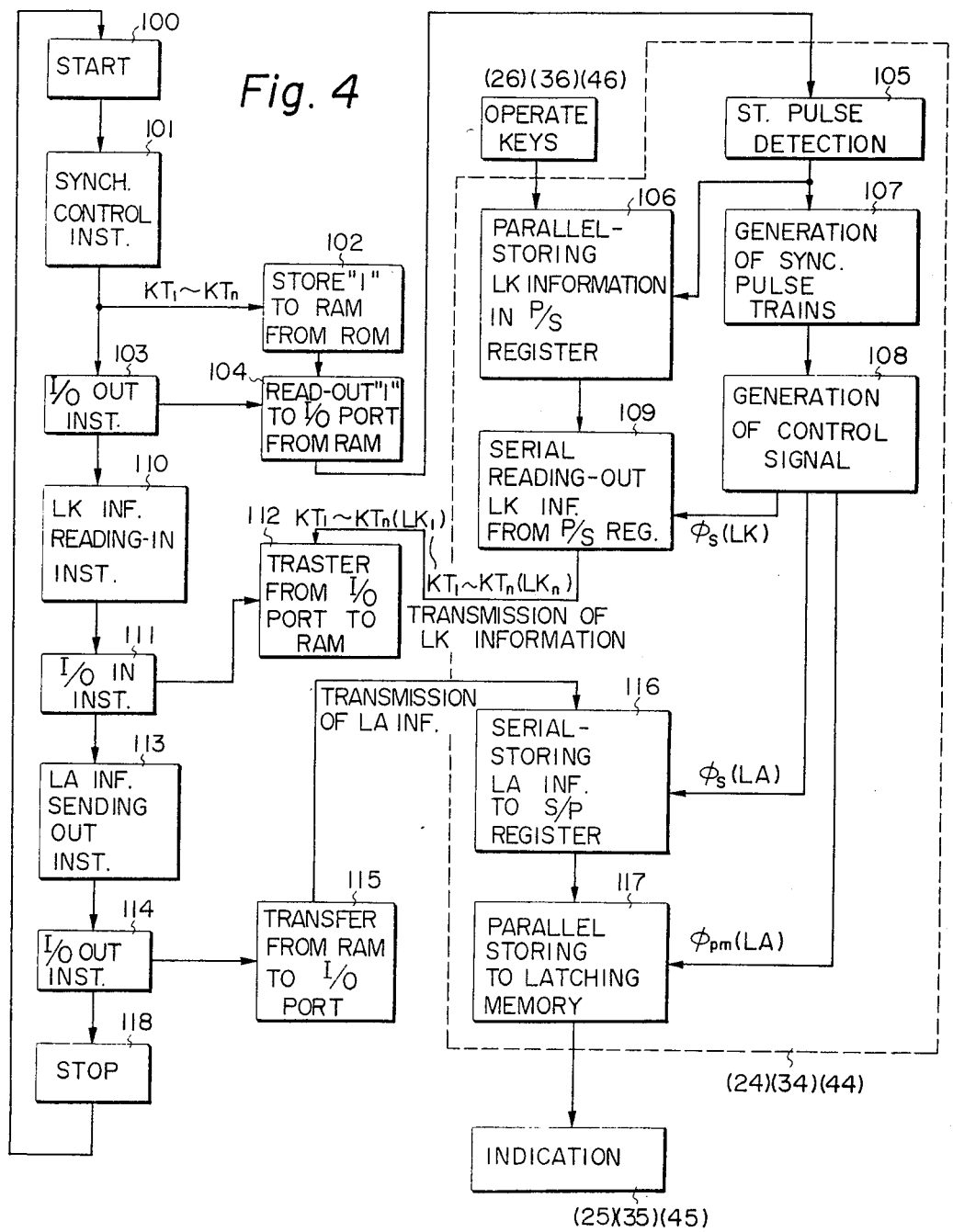
FIG. 4 is a flow-chart explanatory of information transmission employed in this invention.

FIG. 4 is a flow-chart explanatory of the transmission of key information ($LK_1$ to $LK_n$) from a plurality of key telephone sets $KT_1$ to $TK_n$ to the key service unit ME and the transmission of indication information ($LA_1$ to $LA_n$) from the from the key service unit ME to a plurality of key telephone sets $KT_1$ to $KT_n$. Events are numbered in accordance with a time scale. Numerals in parenthesis correspond to the same numbered means shown in FIG. 3. Flows enclosed by a dotted rectangle shows the operations in each of control circuits 24, 34 and 44, which are well-known in the prior art, such as U.S. Pat. No. 4,027,110. A P/S register and an S/P resister adopted in this flow are a parallel-in series-out shift register for LK information and a serial-in parallel-out shift register for LA information, respectively, and included in corresponding one of the control circuits 24, 34 and 44. Moreover, a latching memory is employed to regulate the operation of corresponding one of the indicators 24, 34 and 44 in the operation of the S/P register.

The left column operations of the flow-chart are performed as described below under control of the microprocessor 1 by instructions stored in the ROM 3.

As the start 100, the RAM 2, the I/O ports 8, 9, and 10, and memory elements included in the control circuits 24, 34 and 44 etc. are all cleared when the power is supplied.

A synchronization control instruction 101 is employed to synchronize the time sharing data transmission between the key service unit ME and a plurality of key telephone sets $KT_1$ to $KT_n$. This is performed by sending out a start pulse ST at a time slot (not shown in FIG. 2) just preceding to the time slot of $LK_1$ in FIG. 2 from the key service unit ME to a plurality of key telephone sets $KT_1$ to $KT_n$.

AT a next step 102, a data "1" stored in the ROM 3 is transferred to memory zones of n-bits in the RAM 2 prepared for all the key telephone sets $KT_1$ to $KT_n$.

In next steps 103 and 104, when data "1" stored in the RAM 2 are transferred to all the I/O ports 8, 9 and 10, the start pulses ST are transmitted to all the key telephone sets $KT_1$ to $KT_n$.

At a set 105, the start pulse ST is detected at corresponding one of said key telephone sets $KT_1$ to $KT_n$, and key information of keys 26, 36 or 46 is stored in a parallel configuration in the P/S register at a step 106.

At a step 107, a pulse train corresponding to one frame of time slots ($LK_1$ to $LK_n$, $LA_1$ to $LA_n$) synchronized with the pulse train of the key service unit ME is generated.

At a step 108, control signals $\phi_s$ (LK), $\phi$ (LA) and $\phi_{pm}$ (LA) are produced in response to the former-half ($LK_1$ to $LK_n$), the later-half ($LA_1$ to $LA_n$) and the termination of the one frame, respectively.

Accordingly, if the P/S register (LK) is driven by the control signal $\phi_s$(LK) at a step 109, the key information stored at the step 106 can be transmitted to the key service unit ME at the time slots $LK_1$ to $LK_n$ shown in FIG. 2 synchronized with the key service unit ME.

By LK information reading-in instruction at a step 110, the data transmitted to the key service unit ME is stored in the RAM 2.

Namely, at steps 111 and 112, the states of the I/O ports 8, 9 and 10 corresponding respectively to all the key telephone sets $KT_1$ to $KT_n$ are read-in to the RAM 2.

At steps 113, 114 and 115, LA information is transferred from the key service unit ME at all the key telephone sets $KT_1$ to $KT_n$. However, it is assumed that data to be transmitted are already stored in the RAM 2 in accordance with other data processing steps not shown.

LA information is successively transmitted to the corresponding ones of all the key telephone sets $KT_1$ to $KT_n$ at the time slots $LA_1$ to $LA_n$ and stored at a step 116 in the S/P register (LA) under control of the control signal $\phi_s$ (LA).

At a step 117, when the data are stored in the latching memory under control of the control signal $\phi_{pm}$ (LA), the indicator 25, 35 and 45 are excited.

The above is one frame of data transmission between the key service unit ME and the key telephone sets $KT_1$ to $KT_n$. The similar operations are repeatedly performed.

If the microprocessor 1 is formed so as to have data bus of 8 bits, the same operations are repeatedly performed in m-times, where "m" is defined by $8(m-1) < n \leq 8m$. By way of example, the operation in the step 102 is similarly performed in the data transmission from the RAM 2 to the I/O ports 8, 9 and 10. However, since one time slot of time sharing data transmission between the key service unit ME and a plurality of key telephone sets $KT_1$ to $KT_n$ in accordance with this invention has a relatively long time period, a time for the above m-time transmission is negligible. Accordingly, it can be considered that the data transmission operations between the key service unit ME and a plurality of key telephone sets $KT_1$ to $KT_n$ are synchronously performed.

Figure 5:
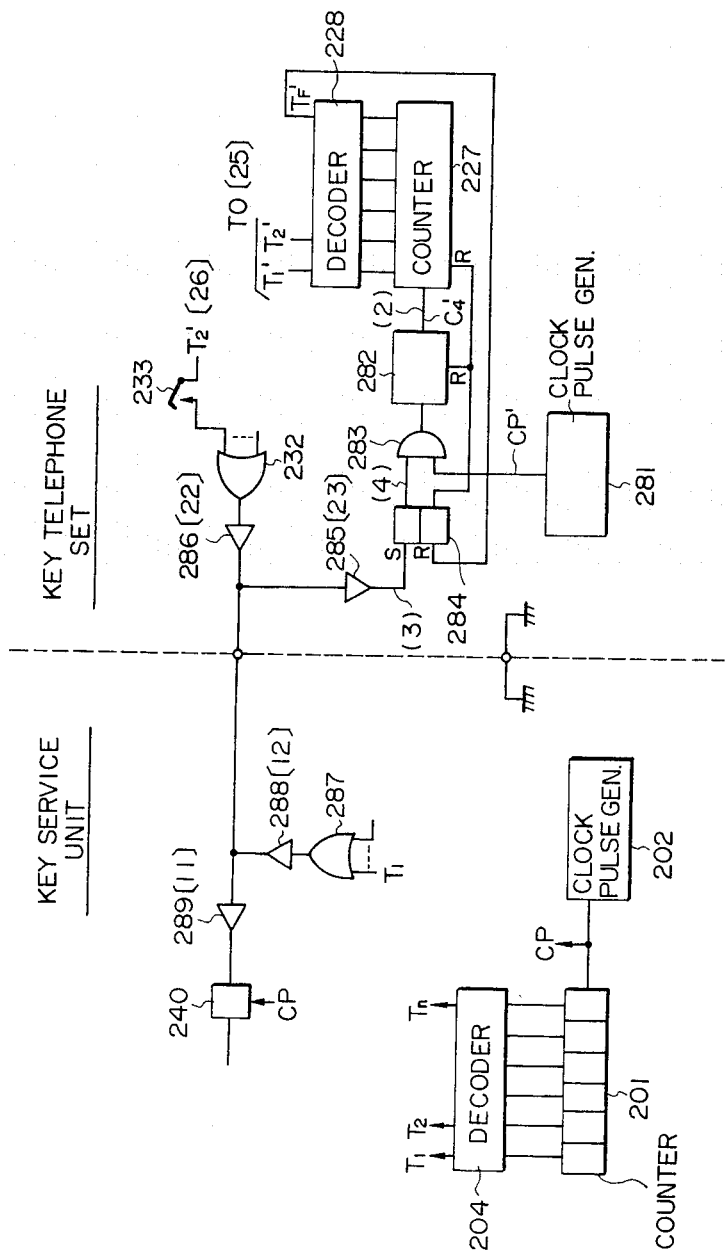
FIG. 5 is a block diagram explanatory of the synchronization operation employed in this invention.

With reference to FIG. 5, the synchronization operation employed in this invention will hereinafter be described in detail.

In FIG. 5, reference numerals 201, 227 and 282 indicate counters; 202 and 281 designates clock pulse generators; 204 and 228 identify decoders; 283 denotes an AND gate; 284 and 240 represent flip-flops; 285, 286, 288 and 289 show inverters; 232 and 287 refer to OR gates; and 233 indicates key contacts. Circuits 11, 12, 12, 23, 25 and 26 are indicated in FIGS. 3 and 5 by the same reference numerals to show corresponding parts.

In the operation of the circuit shown in FIG. 5, the counter 201 is driven by a first clock pulse CP derived from the first clock pulse generator 202 to obtain pulses of a first synchronizing pulse train $T_1$ at the output side of the decoder 204 connected to the output of the counter 201. These pulses are applied via first transmitting means of a path [OR gate 287→inverter 288→inverter 285] to the set terminal S of the flip-flop 284 to set it. Upon setting of the flip-flop 284, the AND gate 283 is opened, and a second clock pulse CP' of the second clock pulse generator 281 is counted by the counter 282, and a carry pulse therefrom is applied as a counting pulse to the counter 227 to derive a second synchronizing pulse train $T_2 \ldots T_n$ from the decoder 228 connected to the output of the counter 227. Then the counter 227 has completed required counting, and for example, full-scale counting, the flip-flop 284 and the counters 282 and 227 are reset by an output $T_F'$ from the decoder 228 at that time.

Figure 6:
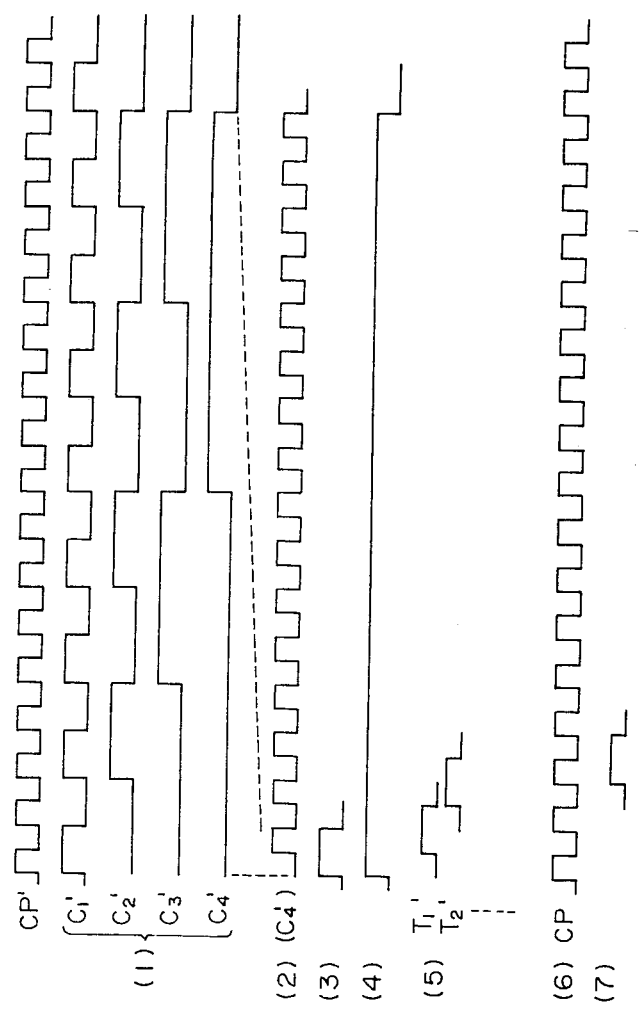
FIG. 6 shows timing charts explanatory of the operation of the example shown in FIG. 5.

The above operations will be described in connection with a timing chart of FIG. 6. Reference character CP' indicates the output from the clock pulse generator 281; and $C_1'$, $C_2'$, $C_3'$ and $C_4'$ in FIG. 6(1) respectively designate outputs from first to fourth stages of the counter 282 formed with a fourstage binary counter for counting the output CP'. Next, upon arrival of a synchronizing pulse (in response to an output signal $T_1$ from the decoder 4) from the key service unit, the flip-flop 284 is set, as shown in FIG. 6(4), to open the AND gate 283, so that the counter 282 is driven by the output CP' and the counter 227 also starts counting. Outputs $T_1'$, $T_2'$, . . . which are derived from the decoder 228 at this time are shown in FIG. 6(5).

Next, the output signal $T_2'$ obtained from the decoder 228 by the above operation is applied by making the contact of the key 233 to an input terminal of the flip-flop 240 via a path [$T_2'$→contact 233→OR gate 232→inverter 286→inverter 289]. The flip-flop 240 is a D flip-flop and is set at the rising edge of the gate signal CP. That is, the output $T_2'$ shown in FIG. 6(5) is applied as an input signal to the flip-flop 240, and its gate is triggered by the signal CP depicted in FIG. 6(6), providing an output shown in FIG. 6(7). As a result of this, the output signals $T_1 \ldots T_n$ from the decoder 204 and the output from the flip-flop 240 which arrives from the key telephone set, are completely synchronized with each other.

The repetition period of the clock pulses CP from the clock pulse generator 202 and the repetition period of the clock pulses CP' from the clock pulse generator 281 are selected to have a constant relationship to each other. That is, the period of the clock pulses CP is selected to be longer than that of the clock pulses CP' by the frequency-dividing ratio of the counter 282, and these periods are set to be highly accurate.

Due to a phase difference between the clock pulses CP of the clock pulse generator 202 and the clock pulses CP' of the clock pulse generator 281, an error is caused between the outputs $T_1 \ldots T_n$ and $T_1' \ldots T_n'$ by the frequency-dividing ratio of the counter 282 at maximum, but this is alleviated by setting the frequency-dividing ratio to be large.

What we claim is:

1. In a key telephone system comprising a key service unit, a plurality of key telephone sets connected to the key service unit each key telephone set having keys operable for developing key information signals and indicators for indicating the busy status of a plurality of CO lines corresponding to said keys, a plurality of pairs of parallel communication lines each connecting a corresponding key telephone sets individually to the key service unit;

the improvement comprising: a plurality of pairs of parallel control lines, each pair connecting a corresponding key telephone set individually to the key service unit; each key telephone set having a parallel-serial converter for converting key information signals to a serial signal configuration for transmission through a corresponding one of said pairs of parallel control lines to said key service unit;

a random-access memory in said key service unit for receiving and storing the key information signals of the key telephone sets;

said key service unit having means effective for connecting and disconnecting said pairs of parallel communication lines to selected ones of said CO lines in reponse to said key information signals and to store status signals representative of said busy status of each CO line and transmit said status signals to each key telephone set over said corresponding parallel control lines.

control means in the key service unit for controlling said storage of the status signals for accessing all of the pairs of parallel control lines simultaneously for key information signals and applying them in a first synchronized access time into the key service unit random-access memory, said control means including additonal control means for reading out from said random access memory stored status signals and applying them at a second synchronized access time through corresponding parallel control lines to the parallel-serial converters of the corresponding key telephone sets as control signals for activating the corresponding indicators of said key telephone sets.

2. In a key telephone system according to claim 1, in which said control means comprises a microprocessor.

3. In a key telephone system according to claim 1, in which said key service unit comprises for each key telephone set a corresponding I/O port to which an individual pair of corresponding control lines are connected, each pair of control lines having a pair of inverters connecting the pair of corresponding control lines to the corresponding I/O port and a pair of inverters connecting the pair of corresponding control lines to the corresponding parallel-serial converter of the corresponding key telephone set.

4. In a key telephone system according to claim 1, in which each key telephone set comprises a talking circuit connected to a corresponding pair of parallel communication lines, and in which said additional control means comprises means for reading out from said random access memory controlled state information of the keys of the corresponding key telephone sets for controlling connection of the corresponding key telephone set pair of parallel communication lines to a CO line, and switch control circuitry in said key service unit responsive to said reading out for effecting control of said connection.

5. In a key telephone system according to claim 1, in which the parallel-serial converter of each key telephone set comprises a P/S register for transmitting the key information signals transmitted therefrom to the random-access memory and an S/P register for receiving the read-out from said access-memory as said status signals and applied as control signals to the corresponding indicator of the key telephone sets, and means for effecting the transmission from the P/S register through the corresponding pair of control lines and means for effecting application of the status signals received from the random-access memory to the S/P register.

* * * * *